US008882587B1

(12) United States Patent
Boyle et al.

(10) Patent No.: US 8,882,587 B1
(45) Date of Patent: Nov. 11, 2014

(54) METHOD AND SYSTEM FOR COUPLING MOBILE INTERACTIVE CONTENT TO A CLUB REWARD SYSTEM

(75) Inventors: Stephen S. Boyle, Lincoln, CA (US); Russell S. Greer, Los Gatos, CA (US)

(73) Assignee: Joingo, LLC, San Jose, CA (US)

( * ) Notice: Subject to any disclaimer, the term of this patent is extended or adjusted under 35 U.S.C. 154(b) by 492 days.

(21) Appl. No.: 13/279,232

(22) Filed: Oct. 21, 2011

Related U.S. Application Data

(60) Provisional application No. 61/405,699, filed on Oct. 22, 2010.

(51) Int. Cl.
*G06F 17/00* (2006.01)

(52) U.S. Cl.
USPC .............................................. 463/29; 463/43

(58) Field of Classification Search
CPC .... G07F 17/32; G07F 17/3225; G07F 17/323
USPC ...................................... 463/29, 43
See application file for complete search history.

(56) References Cited

U.S. PATENT DOCUMENTS

| | | | |
|---|---|---|---|
| 2004/0171380 A1 | 9/2004 | Puranik et al. | |
| 2006/0073788 A1 | 4/2006 | Halkka et al. | |
| 2007/0073808 A1 | 3/2007 | Berrey et al. | |
| 2007/0088801 A1 | 4/2007 | Levkovitz et al. | |
| 2007/0233585 A1* | 10/2007 | Ben Simon et al. | 705/35 |
| 2008/0059631 A1 | 3/2008 | Bergstrom et al. | |
| 2008/0287095 A1 | 11/2008 | Pousti | |
| 2009/0024457 A1 | 1/2009 | Foroutan | |
| 2009/0088219 A1 | 4/2009 | Bayne | |
| 2009/0138337 A1 | 5/2009 | Moukas et al. | |
| 2009/0164310 A1 | 6/2009 | Grossman | |
| 2009/0203359 A1 | 8/2009 | Makhoul et al. | |
| 2009/0204496 A1 | 8/2009 | Otto et al. | |
| 2009/0327488 A1 | 12/2009 | Sampat et al. | |
| 2010/0004045 A1 | 1/2010 | Roemer | |
| 2010/0016070 A1* | 1/2010 | Walker et al. | 463/25 |
| 2010/0121709 A1 | 5/2010 | Berezin et al. | |
| 2010/0160038 A1* | 6/2010 | Youm et al. | 463/29 |
| 2010/0197410 A1* | 8/2010 | Leen et al. | 463/42 |
| 2011/0054977 A1 | 3/2011 | Jaffer | |
| 2011/0111855 A9* | 5/2011 | Hardy et al. | 463/42 |
| 2011/0191152 A1 | 8/2011 | Schwartz | |
| 2011/0195766 A1* | 8/2011 | Toompere | 463/13 |
| 2011/0275438 A9* | 11/2011 | Hardy et al. | 463/42 |
| 2012/0004036 A1* | 1/2012 | Hill | 463/42 |

* cited by examiner

*Primary Examiner* — Michael Cuff
(74) *Attorney, Agent, or Firm* — Clause Eight IPS; Michael Catania

(57) ABSTRACT

The method and system for coupling mobile interactive content to a club reward program is disclosed herein. A business utilizes the present inventions as part of a marketing campaign that is targeted to a customer's mobile communication device. The invention delivers an enticing interactive game to their customer's mobile communication device, rewarding the customer for successfully completing the game with prizes, recording the game player and game details, and auditing the information to ensure the integrity of the game play outcome, and automatically logging those prizes into the business' club reward system.

9 Claims, 6 Drawing Sheets

METHOD AND SYSTEM FOR COUPLING MOBILE INTERACTIVE CONTENT TO A CLUB REWARD SYSTEM

CROSS REFERENCES TO RELATED APPLICATIONS

The Present Application claims priority to U.S. Provisional Patent Application No. 61/405,699, filed on Oct. 22, 2010, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to mobile communication interactions with reward clubs. More specifically, the present invention relates to a method and system for interacting with a member of an enterprise's rewards club through mobile communication devices.

2. Description of the Related Art

The use of mobile phones, handsets and other wireless devices is becoming a primary means for individuals to stay connected in their personal and professional lives. Mobile handsets and other wireless devices are being targeted by businesses to aid in the marketing efforts of the business to deliver specific content directly to prospective customers. One means of marketing includes the se of a "Rewards Club" program, utilized by businesses in many different industries to offer their customers special incentives for their repeat business. The challenge is to keep the customer engaged and earning rewards that will motivate them to more frequently patronize the business, as well as ensuring the authenticity of earned rewards.

Methods currently in use to earn rewards include tracking activities performed when the customer is visiting the business, and sending promotional material to the customer via mail or e-mail thereby requiring a response from the customer. The problem with these methods of earning rewards is that the promotion is only being presented to the customer when they are physically at the business location, and the promotional material sent via mail or e-mail are often deemed "junk mail" or "spam", and are disposed of without being acted upon by the customer. Also, methods currently in use to ensure the authenticity of rewards include visual inspection of a reward receipt, often in the form of "punched" or "stamped" paper card, and requiring the customer to register their card or Rewards Club account online at the business' website or in person at the business' physical location before the customer can earn and/or redeem rewards. The problem with these methods of ensuring the authenticity of rewards is that fraud can be easily missed upon visual inspection, and that requiring the customer to initiate several steps before their rewards are authenticated discourages many customers from participating.

Roemer, U.S. Patent Publication Number 20100004045 for a Method And System For Awarding Bonuses Via Telecommunication Links discloses calling members of a casino player rewards club to award bonuses to the player.

Schwartz, U.S. Patent Publication Number 20110191152 for ASSIGNING A MOBILE-REDEEMABLE PERSONAL IDENTIFICATION NUMBER TO A CONSUMER AS A MOBILE REWARD OR FOLLOWING A PURCHASE OF A PROMOTIONAL ITEM discloses a method to promote the sale of branded products through in-store acquisition of branded products or out-of store promotions designed to enhance retention of mobile rewards including one or more of the following rewards: mobile sweepstake ballots, mobile loyalty points, and mobile coupons.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

There is a need for an enterprise to interact with a member of the enterprise's rewards club through the member's mobile communication device in order to reward the member in an entertaining manner.

BRIEF SUMMARY OF THE INVENTION

The present invention enables an enterprise or business to send to their customer's data capable communication device an enticing interactive game that is related to the products and services the enterprise is promoting. The customer is rewarded with prizes for successfully completing the game, and the prizes are automatically logged into the enterprise's club reward system for the customer. The system that generates the mobile game play for prizes is designed to prevent tampering and fraud. The system links and records each individual game player (customer or end user), each game and each associated step of a game for post game play auditing by the system. The process of recording and auditing helps ensure outcome integrity of the game. The method and system of the present invention keeps the customer receptive to the marketing efforts of the enterprise by delivering to the customer's data capable communication device an interactive game played for prizes which automatically records the prizes to the enterprise's club reward system. The method and system also guards against fraud to the enterprise since the game player and game details are recorded and audited for each game.

In operation, the method and system for coupling mobile interactive content to a club reward program is software that a business utilizes as part of a marketing campaign that is targeted to the customer's mobile communication device. The business integrates this software with other existing software to enable delivery of an enticing interactive game to their customer's mobile communication device, rewarding the customer for successfully completing the game with prizes, recording the game player and game details, and auditing the information to ensure the integrity of the game play outcome, and automatically logging those prizes into the business' club reward system.

The system is preferably comprised of a mobile communication device capable of running mobile software applications. A mobile application resident on the mobile communication device that supports interactive executable content, collects user input, and queues the content up for opportunistic delivery to the fixed network. A piece of interactive content that requires the user to perform some action in order to gain access to a reward. A server in the fixed network that is connected to the club reward system by a reliable data network. The server accepts the stream of past user input from the mobile software application, decodes the stream into a set of outcomes, maps the outcomes to rewards, ensures transaction integrity, and uploads the rewards to the club reward system.

The present invention provides a superior means for a business to engage their customers in a marketing promotion via the customer's mobile communication device, providing the customer a means of earning rewards, written in such a way that it is not susceptible to tampering, recording the game player and game details, and auditing the information to ensure the integrity of the game play outcome, and automatically logging earned prizes into the business club reward system.

One aspect of the present invention is a method for coupling mobile interactive content to a club reward system. The method includes requesting a game from a mobile software application on a data capable communication device. The method also includes assigning a game ID to the game and a plurality of step IDs to each of the steps of the game. The method also includes generating a decision path for the game and delivering the decision path to a decision path database. The method also includes playing the game. The method also includes recording the steps of the game as completed at a mobile resident path database. The method also includes completing the game and delivering a final outcome to a decision path database. The method also includes auditing the game player, the game, and the decision path for validity of the game play. The method also includes recording a prize associated with successfully completing the game at a club rewards prize database.

Another aspect of the present invention is a method for coupling mobile interactive content to a club reward system. The method includes requesting a game from a mobile software application on a data capable communication device. The method also includes assigning a game ID to the game and a plurality of step IDs to each of the steps of the game. The method also includes generating a decision path for the game and delivering the decision path to a decision path database. The method also includes requesting additional content for the game through a communications director client wherein a storage manager attaches game information and a content decision path to the content request. The method also includes transmitting the content from the content server to the communications director client. The method also includes transmitting the content decision path to the decision path database. The method also includes transmitting the content decision path to the storage manager. The method also includes transmitting the content from communications director client to the game engine. The method also includes playing the game. The method also includes recording the steps of the game as completed at a mobile resident path database. The method also includes completing the game and delivering a final outcome to a decision path database. The method also includes auditing the game player, the game, and the decision path for validity of the game play. The method also includes recording a prize associated with successfully completing the game at a club rewards prize database.

Yet another aspect of the present invention is a method for coupling mobile interactive content to a club reward system. The method includes requesting a game from a mobile software application on a data capable communication device. The method also includes assigning a game ID to the game and a plurality of step IDs to each of the steps of the game. The method also includes generating a decision path for the game and delivering the decision path to a decision path database. The method also includes playing the game. The method also includes recording the steps of the game as completed at a mobile resident path database. The method also includes completing the game and delivering a final outcome to a decision path database. The method also includes auditing the game player, the game, and the decision path for validity of the game play by determining the identity of the game player, determining the identification of the game and matching the game ID to the game, and analyzing the decision path of the game by confirming the step IDs for the game. The method also includes recording a prize associated with successfully completing the game at a club rewards prize database.

Yet another aspect of the present invention is a system for coupling mobile interactive content to a club reward system. The system includes a data capable communication device, a network, a communications director server, a game logic compiler, a content server comprising content for a plurality of games, a decision path database, an audit engine, and a club prize reward database. The data capable communication device comprises a mobile resident software application comprising a communications director client, a game engine, and a mobile resident storage manager. The mobile resident software application is configured to provide a plurality of games. The game logic compiler is configured to assign a game ID to a game of the plurality of games selected to be played and a assign plurality of step IDs to each of the steps of the selected game. The game logic compiler is also configured to generate a decision path for the game and deliver the decision path to the decision path database. The audit engine is configured to audit the game player, the game, and the decision path for validity of the game play, and configured to record a prize associated with successfully completing the game at a club rewards prize database.

Yet another aspect of the present invention is a method for coupling mobile interactive content to a club reward system. The method includes requesting a game from a mobile software application on a data capable communication device. The method also includes assigning a game ID to the game and a plurality of step IDs to each of the steps of the game. The method also includes generating a decision path for the game and delivering the decision path to a decision path database. The method also includes playing the game. The method also includes recording the steps of the game as completed at a mobile resident path database. The method also includes completing the game and delivering a final outcome to a decision path database. The method also includes recording a prize associated with successfully completing the game at a club rewards prize database.

Yet another aspect of the present invention is a method for coupling mobile interactive content to a club reward system. The method includes requesting an interactive content from a mobile software application on a data capable communication device. The method also includes assigning an identification to the interactive content and a step identification to each of the steps of the interactive content. The method also includes generating a decision path for the interactive content and delivering the decision path to a decision path database. The method also includes recording the steps of the interactive content as completed at a mobile resident path database. The method also includes completing the interactive content and delivering a final outcome to a decision path database. The method also includes recording a prize associated with successfully completing the interactive content at a club rewards prize database.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
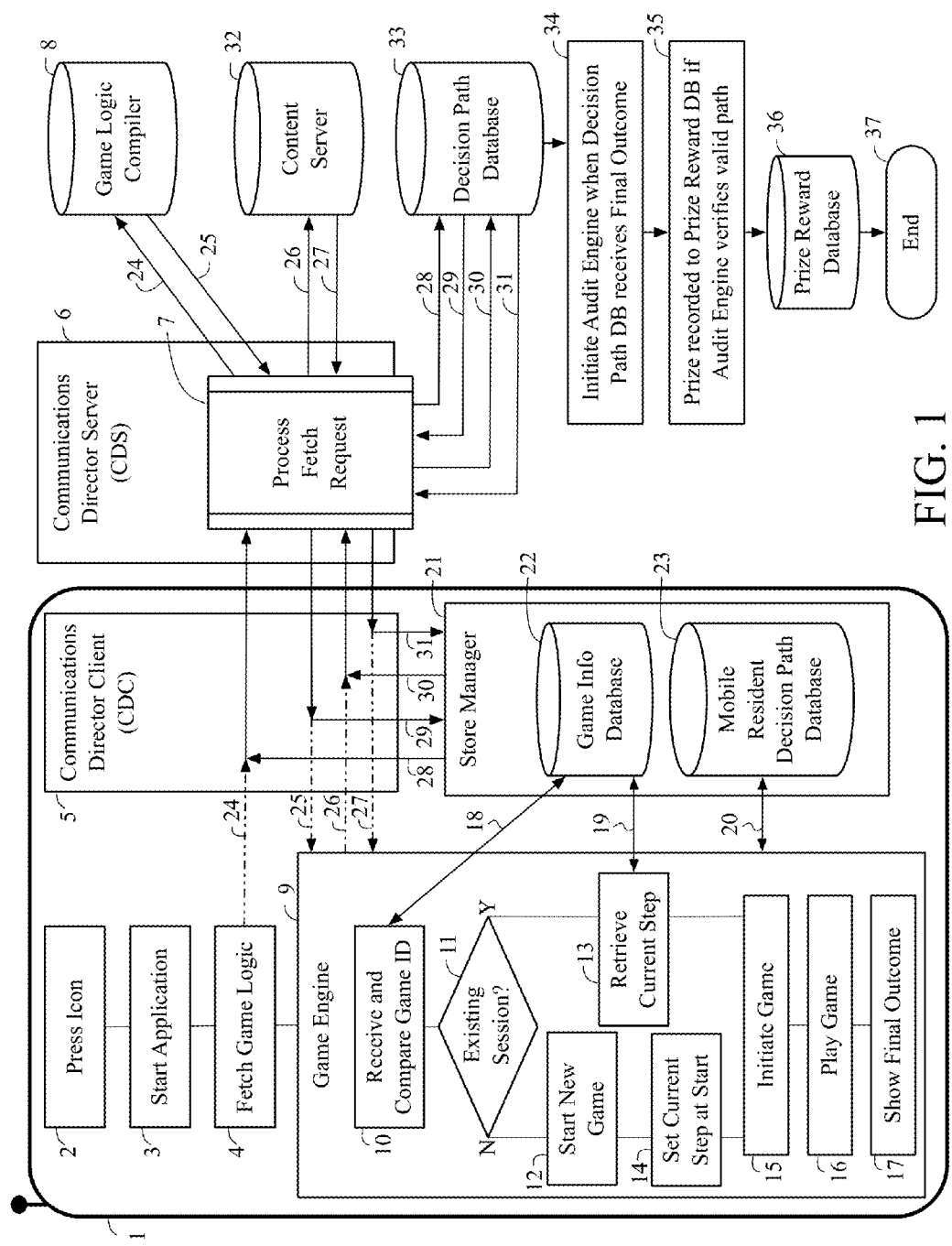
FIG. 1 is a block diagram of an invention for coupling mobile interactive content to a club reward system.

A system for coupling mobile interactive content to a club reward system of an enterprise is generally designated 100. The system 100 is preferably comprised of a data capable communication device 1, a network, a communications director server 6, a game logic compiler 8, a content server 32, a decision path database 33, an audit engine 34 and a prize reward database 36. The data capable communication device 1 preferably comprises a mobile resident software application 3, which is written in a programming language that runs on an operating system of the data capable communication device 1. Those skilled in the pertinent art will recognize that the programming language can be written to run on any operating system of a mobile communication device.

The enterprise can be any type of organization that desires to conduct a mobile marketing campaign or similar mobile marketing to end users. The enterprise can be a business like Exxon, Apple, Nordstrom or the like. The enterprise can be a non-profit or charity, like the American Red Cross. The enterprise can be a government agency like FEMA. The enterprise can be a political party. The enterprise can be an organization like the American Medical Association. Those skilled in the pertinent art will recognize other types of enterprises that can use the present invention.

The data capable communication device 1 utilized with the present invention can include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server such as the communication director server 6, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the communications director server 6 is preferably HTTP.

Mobile communication service provider (aka phone carrier) of the end user such as VERIZON, AT&T, SPRINT, T-MOBILE, and the like mobile communication service providers, provide the communication network for communication to the data capable communication device 1.

The primary components of the mobile resident software application are preferably a communications director client 5, a game engine 9, and a mobile resident storage manager 21.

Referring specifically to FIG. 1, the data capable communication device 1 displays an icon 2 which is pressed to commence the mobile resident software application 3. This action prompts the mobile resident software application 3 to fetch a game logic 4. The request for the game logic 24 is sent through the communications director client 5, wherein the storage manager 21 attaches a related decision path 28 to the game logic request 24.

The request is sent from the communication director client 5 over a network to the communications director server 6 located at a game site 101. The communications director server 6 processes the fetch request 7 by determining if the fetch request 7 is for game logic or content, and communications director server 6 retrieves the game logic or content from either the game logic compiler 8 or the content server 32. For example, if the fetch request 7 is for game logic, the fetch request 7 is delivered to the game logic compiler 8. The communications director server 6, game logic compiler 8, the content server 32 and the decision path database 33 preferably all reside at the game site 101.

Within the game logic compiler 8, the game is assigned a unique game identification, and the steps within the game are also assigned a unique game identification, which are attached to the game logic 25. The game logic 25 is delivered from the game logic compiler 8 to the communications director server 6. Concurrently, the communications director server 6 delivers the decision path 28 for the game to the decision path database 33. Also, any residual decision path 29 which was not accepted by the decision path database 33 is preferably returned to the communications director server 6 for delivery to the mobile resident decision path 23 so that the residual decision path may be attached to the next fetch request. The game logic 25, which now includes the game ID 38 and step IDs 39, is delivered with the residual decision path 29 over the network to the communications director client 5. In this manner, the entire game, with all of the possible outcomes, is delivered in one transmission to the data capable communications device 1 in order to avoid delays in the game play by the end user.

At the communications director client 5, on the data capable communications device 1, the decision path 29 is delivered to the storage manager 21, and the game logic 25, including the game ID 38 and the step IDs 39, is delivered to the game engine 9. As mentioned above, the entire game with the outcome is delivered in essentially a single transmission as opposed to an end-user playing the game and waiting for transmissions for the completed step to be sent to a server and retrieval of the next step from the server.

The game engine 9 receives the game logic 25. In order for the game engine 9 to determine if a game already exists on the data capable communication device 1, the game engine 9 preferably compares the game ID 10 received from the game logic compiler 8 to any existing game ID in a game information database 22. The game information database 22 preferably contains existing game ID 38 and maintains record of the current step of game play. A request for and retrieval of existing game ID 38 and the current step of any such game play 18 is made by the game engine 9. The game engine 9 then makes a decision if the game play is an existing session 11. If game ID 38 was not located in the game information database 22, then the game is initiated 15 and the end user plays the game 16. Upon completing the game, game engine 9 commences a new game 12, setting the current step of game play at start 14.

Alternatively, if a game ID was found in the game information database 22, and thus there is an existing game, at block 13 the game engine 9 retrieves the current step 19 of game play from the game information database 22 and the process of the current step 19 of the game play being requested and received takes place at block 13. The game is initiated at block 15, and the end user plays the game 16. Upon completing the game, the final outcome is shown 17.

As the game engine 9 runs through the steps of game play, blocks 10-17 on FIG. 1, the steps are recorded to the mobile resident decision path database 23 on the data capable communication device 1, where the steps are grouped together to form a decision path 54 for the completed game. When a data request is sent from the game engine 9 to the communications data server 6, the game ID and decision path 54 are attached to the data request. As discussed, below, the decision path 54 prevents fraud on the enterprise.

When the game engine 9 encounters a need for content to continue, a content request is made from the game engine 9. The content request is sent through the communications director client 5, where the storage manager 21 attaches any related game information and decision path 30 to the content request 26. With the game information and decision path 30 attached to the content request, the communications director client 5 sends the request over the network to the communications director server 6. The communications director server 6 processes the fetch request 7 by determining if the request is for game logic or content and retrieving from the appropriate source. For a content request, the content request 26 is delivered to the content server 32. The content server 32 delivers the content 27 to the communications director server 6. Concurrently, the communications director server 6 delivers the decision path 30 to the decision path database 33. Any residual decision path 31 that was not accepted by the decision path database 33 is returned to the communications director server 6 for delivery to the mobile resident decision path database 23 so that the residual decision path may be attached to the next fetch request. The content 27 is delivered with the residual decision path 31 from the communications director server 6 over the network to the communications director client 5 on the data capable communication device 1. At the communication director client 5, the decision path is delivered to the storage manager 21, and the content is delivered to the game engine 9.

Upon completion of the game, when the decision path database 33 receives and accepts the final outcome for the game, the audit engine 34 is initiated for validation of the game. The audit engine 34 verifies that the game player, game and decision path are valid, and if they are valid, the audit engine records the associated prize to the prize reward database 36. The program then ends 37. The audit engine 34 preferably resides at the game site 101, while the prize reward database preferably resides at an enterprise site.

Figure 2:
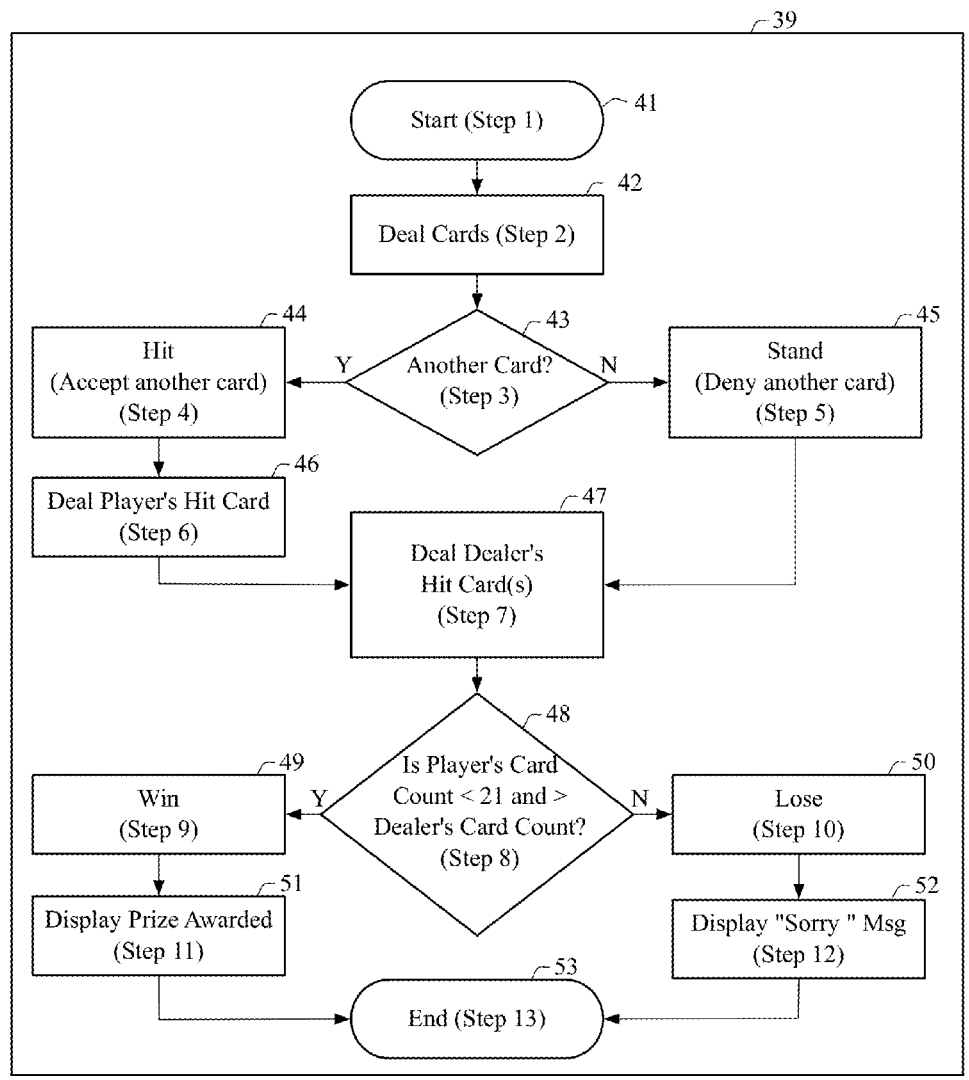
FIG. 2 is a flow chart for the method of assigning identifications to each of the steps of an exemplary game utilized in the invention for coupling mobile interactive content to a club reward system.
Figure 5:
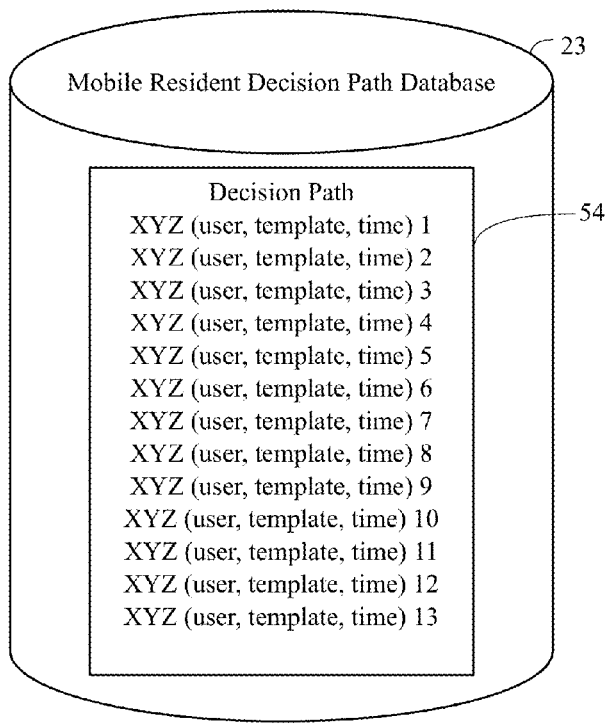
FIG. 5 is a block diagram of a mobile resident decision path database utilized with an invention for coupling mobile interactive content to a club reward system.

FIG. 2 details a preferred embodiment of assigning the step IDs 39 for a game, illustrating how each step is assigned a number to be used in forming the decision path 54, as seen in FIG. 5. In this preferred example, the game played is blackjack, but those skilled in the pertinent art will recognize that other games may be and offered and played without departing from the spirit and scope of the present invention. The start of game 41 is assigned step 1. The command to "Deal Cards" 42 is assigned step 2. The prompt for a decision "Another Card?" 43 is assigned step 3. If yes, the action "Hit (Accept another card)" 44 is assigned step 4. If no, the action "Stand (Deny another card)" 45 is assigned step 5. The command "Deal Player's Hit Card" 46 is assigned step 6. The command "Deal Dealer's Hit Card(s)" 47 is assigned step 7. The prompt for a decision "Is Player's Card Count Less Than 21 and Greater Than Dealer's Card Count?" 48 is assigned step 10. The command "Display Prize Awarded" 51 is assigned step 11. The command "Display Sorry Message 52 is assigned step 12. The End of Game is assigned step 13. Thus, the entire game play is assigned steps and delivered with the game to avoid back and forth transmissions while providing a mechanism to avoid fraud on the enterprise.

Figure 3:
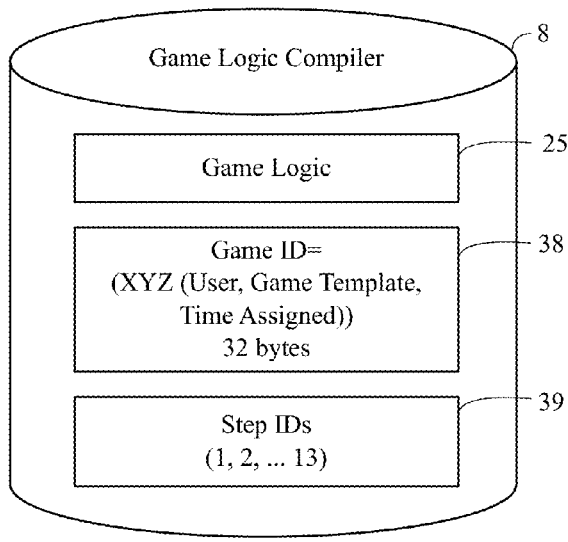
FIG. 3 is a block diagram of a game logic compiler utilized with an invention for coupling mobile interactive content to a club reward system.

FIG. 3 details a preferred embodiment of the game logic compiler 8, illustrating that the game logic compiler 8 preferably comprises the game logic 25, generates the game ID 38, and generates the step IDs 39. The game ID 38 is preferably comprised of unique identifying data preferably equaling 32 bytes, in this example a randomly chosen combination of three letters, the user name, the game template, and the time assigned, all strung together in the following manner: XYZ (USER, GAME TEMPLATE, TIME ASSIGNED). However, those skilled in the pertinent art will recognize that any identifying data may be used without departing from the spirit and scope of the invention.

Figure 4:
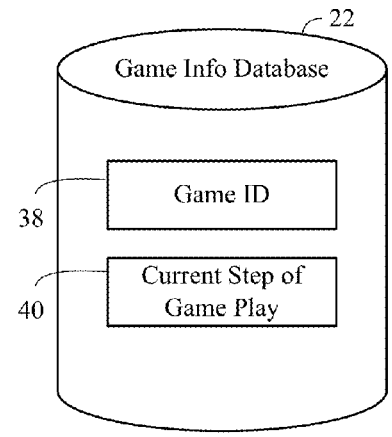
FIG. 4 is a block diagram of a game information database utilized with an invention for coupling mobile interactive content to a club reward system.

FIG. 4 details a preferred embodiment of the game information database 22, illustrating that the game information database contains the existing game ID 38 and the current step of game play 40.

FIG. 5 details a preferred embodiment of the mobile resident decision path database 23 illustrating that the mobile resident decision path database 23 contains the decision path 54. As each step of game play is recorded 20 to the mobile resident decision path database 23 (as shown in FIG. 1), the chosen step IDs 39 are attached to the game ID 38, and these steps are grouped together to form the decision path 54. The decision path 54 is later audited by the audit engine on the fixed network to ensure the integrity of the outcome of the game.

Figure 6:
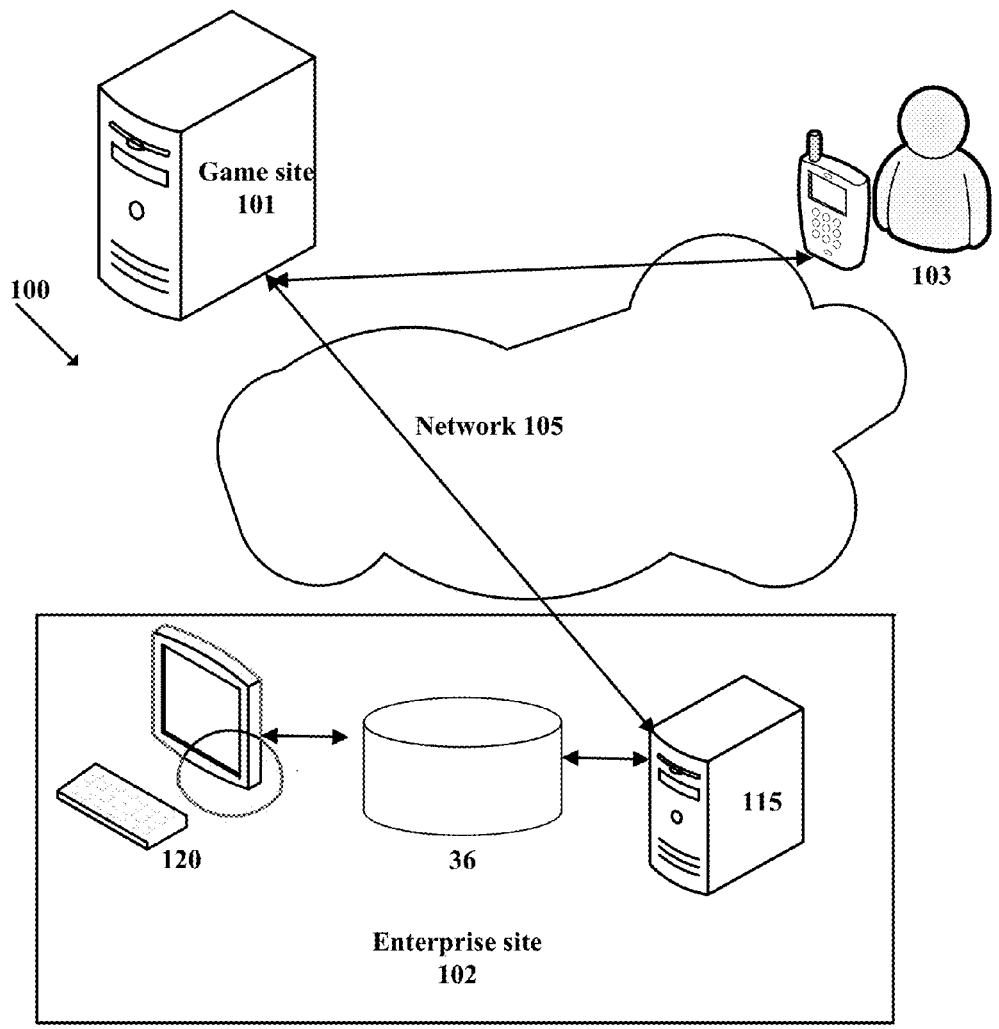
FIG. 6 is a block diagram of a system for coupling mobile interactive content to a club reward system.

FIG. 6 is an illustration of a block diagram of an overall system 100 for coupling mobile interactive content to a club reward system. The end user 103 uses his or her data capable communication device 1 to request a game. The game site 101 receives the request over the network and, as discussed above, provides the game for the end user 103 to play. The game site 101 interacts with enterprise site 102 over the network 105, preferably through a patron server 115 which interacts with the prize reward database 36 and an enterprise computer 120.

Figures 7, 8:
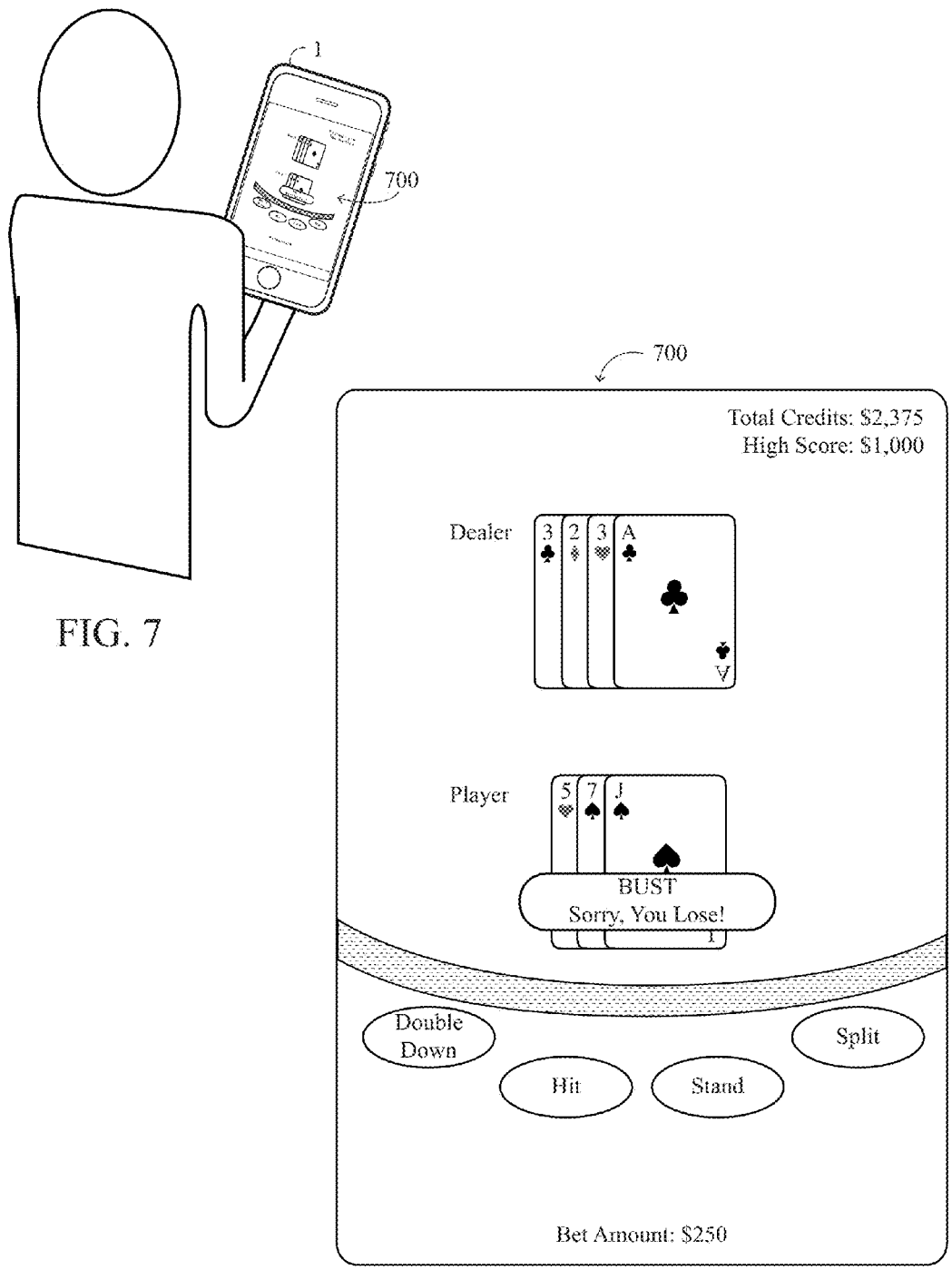
FIG. 7 is an illustration of an end-user playing a game on a data capable communication device as part of a club reward system.
FIG. 8 is an isolated view of the screen of a data capable communication device of FIG. 7 illustrating a blackjack game being played by the end user.

As shown in FIGS. 7 and 8, the end user plays the game on the data capable communication device 1, with the game shown on the display screen 700 of the data capable communication device 1. The present invention allows the end user to play the game without delay since the entire game with the decision path for validation purposes, is transmitted to the data capable communication device 1 over the network.

Figure 9:
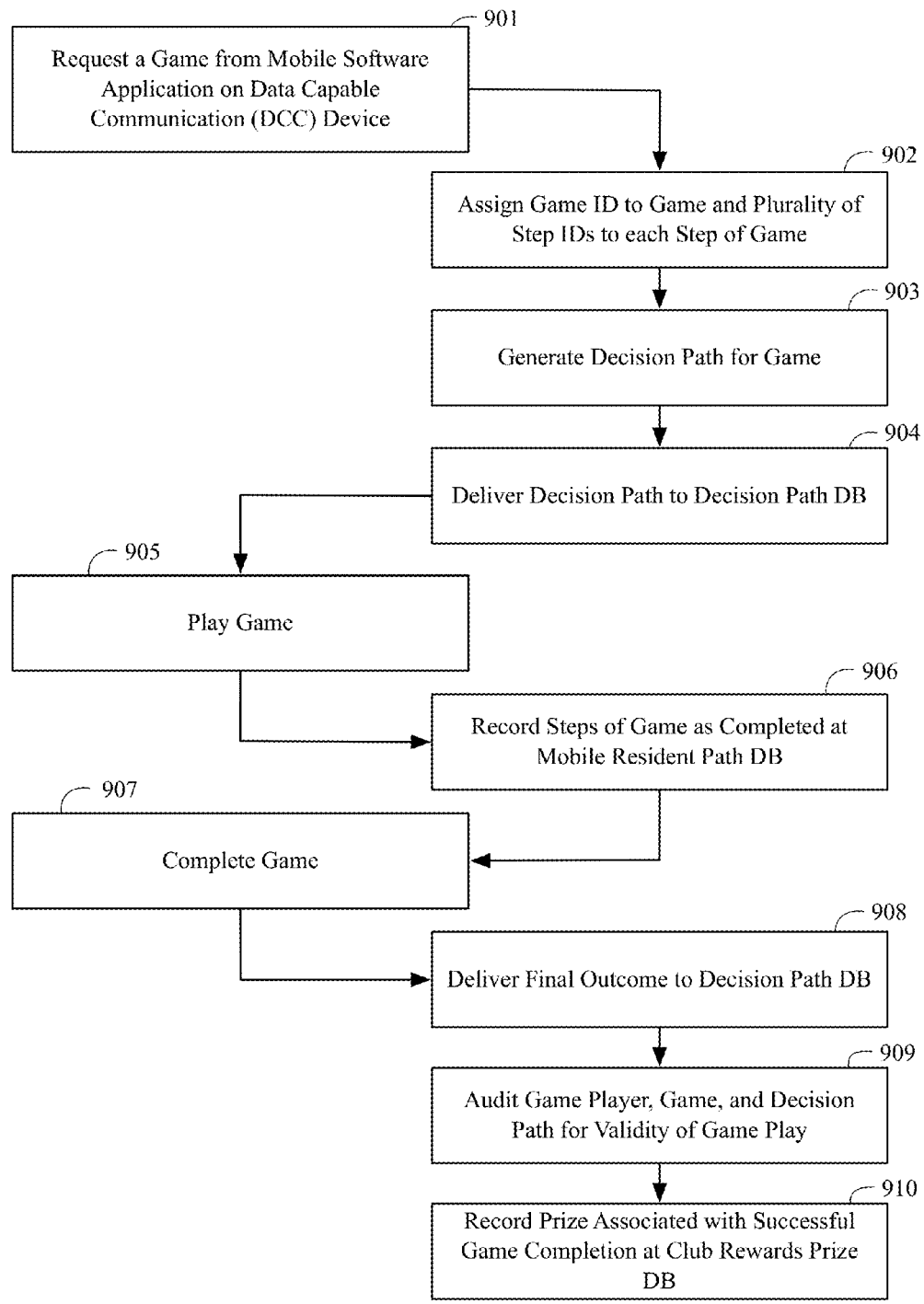
FIG. 9 is a flow chart of a preferred method for coupling mobile interactive content to a club reward system.

A flow chart of a preferred method for coupling mobile interactive content to a club reward system is shown in FIG. 9. The method 900 begins at block 901 with requesting a game from a mobile software application on a data capable communication device. At block 902, a game ID is assigned to the game and a plurality of step IDs are assigned to each of the steps of the game. At block 903, a decision path for the game is generated. At block 904, the decision path is delivered to a decision path database. At block 905, the game is played by an end user on a data capable communication device. At block 906, the steps of the game as completed are recorded at a mobile resident path database. At block 907, the game is completed by the end user. At block 908, a final outcome is delivered to a decision path database. At block 909, the game player, the game, and the decision path are audited for validity of the game play. At block 910, a prize associated with successfully completing game is automatically recorded at a club rewards prize database.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim:

1. A method for coupling mobile interactive content to a club reward system, the method comprising:
   commencing a game on a mobile software application resident on a data capable communication device;
   requesting a game logic for the game from the mobile software application to a communications director server over a network;
   transmitting the request for game logic to a game logic compiler;
   assigning a game ID to the game logic and a plurality of step IDs to each of the steps of the game at the game logic compiler;
   transmitting the game logic with the game ID and the steps of the game with plurality of step IDs to the communications director server;
   generating a decision path for the game and delivering the decision path from the communications director server to a decision path database;
   transmitting the game logic with the game ID and the steps of the game with plurality of step IDs from the communications director server over a network to the mobile software application resident on the data capable communication device;
   playing the game on the mobile software application on the data capable communication device;
   recording the steps of the game as completed at a mobile resident path database on the data capable communication device;
   completing the game on the mobile software application on the data capable communication device and delivering a final outcome over a network to a decision path database; and
   recording a prize associated with successfully completing game at a club rewards prize database;
   wherein the data capable communication device is a mobile phone or a tablet computer.

2. The method according to claim 1 further comprising:
   requesting additional content for the game through a communications director client on the mobile software application on the data capable communication device wherein a storage manager attaches game information and a content decision path to the content request;
   transmitting the content from the content server to the communications director client;
   transmitting the content decision path to the decision path database;
   transmitting the content decision path to the storage manager; and
   transmitting the content from communications director client to the game engine.

3. The method according to claim 1 further comprising auditing at an audit engine at a game site the game player, the game, and the decision path for validity of the game play.

4. The method according to claim 3 wherein auditing the game player, the game, and the decision path for validity of the game play comprises:
   determining the identity of the game player;
   determining the identification of the game and matching the game ID to the game; and
   analyzing the decision path of the game by confirming the step IDs for the game.

5. The method according to claim 1 wherein assigning the plurality of step IDs for the steps of the game logic is utilized to generate the decision path.

6. A method for coupling mobile interactive content to a club reward system, the method comprising:
   requesting an interactive content from a mobile software application resident on a data capable communication device;
   requesting a game logic for the interactive content from the mobile software application to a communications director server over a network;
   transmitting the request for game logic to a game logic compiler;
   assigning an identification to the interactive content and assigning step identification to each of a plurality of steps of the interactive content at the game logic compiler;
   generating a decision path for the interactive content and delivering the decision path from the communications director server to a decision path database;
   transmitting the game logic with the game ID and the steps of the interactive econtent with plurality of step IDs from the communications director server over a network to the mobile software application resident on the data capable communication device;
   interacting with the interactive content on the mobile software application on the data capable communication device;
   recording the steps of the interactive content as completed at a mobile resident path database on the data capable communication device;
   completing the interactive content and delivering a final outcome to a decision path database; and
   recording a prize associated with successfully completing the interactive content at a club rewards prize database;
   wherein the data capable communication device is a mobile phone or a tablet computer.

7. The method according to claim 6 further comprising auditing at an audit engine at a game site the player, the interactive content, and the decision path for validity of the interaction of the interactive content.

8. The method according to claim 7 wherein auditing the player, the interactive content, and the decision path for validity of the interaction of the interactive content comprises:
   determining the identity of the player;
   determining the identification of the interactive content and matching the identification of the interactive content to the interactive content; and
   analyzing the decision path of the interactive content by confirming the step IDs for the interactive content.

9. The method according to claim 6 wherein the interactive content is an interactive game.

* * * * *